United States Patent
Hirata

(10) Patent No.: US 8,392,167 B2
(45) Date of Patent: Mar. 5, 2013

(54) THREE-DIMENSIONAL BOARD WARP ANALYSIS SYSTEM, THREE-DIMENSIONAL BOARD WARP ANALYSIS DEVICE, THREE-DIMENSIONAL BOARD WARP ANALYSIS METHOD AND PROGRAM

(75) Inventor: Ichiro Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 272 days.

(21) Appl. No.: 12/681,120

(22) PCT Filed: Sep. 29, 2008

(86) PCT No.: PCT/JP2008/067637
§ 371 (c)(1),
(2), (4) Date: Apr. 1, 2010

(87) PCT Pub. No.: WO2009/044699
PCT Pub. Date: Apr. 9, 2009

(65) Prior Publication Data
US 2010/0223030 A1    Sep. 2, 2010

(30) Foreign Application Priority Data
Oct. 2, 2007    (JP) .................................. 2007-258298

(51) Int. Cl.
G06F 17/50    (2006.01)
G06G 7/62    (2006.01)
(52) U.S. Cl. ............................................ 703/13; 700/97
(58) Field of Classification Search ................ 703/1, 13; 700/97–98
See application file for complete search history.

(56) References Cited

U.S. PATENT DOCUMENTS
2005/0071030 A1 *    3/2005    Itoh ................................. 700/98

FOREIGN PATENT DOCUMENTS
| JP | 2004013437 A | 1/2004 |
| JP | 2006278803 A | 10/2006 |
| JP | 2006339423 A | 12/2006 |

OTHER PUBLICATIONS

International Search Report for PCT/JP2008/067637 mailed Dec. 18, 2008.

J. Oda et al., "Analysis of Stress and Deflection of Printed Plate Board Using Multilayered Beam Theory", Transactions of the Japan Society of Mechanical Engineers, vol. 59, No. 563, 1993, pp. 203-208.

* cited by examiner

*Primary Examiner* — Eunhee Kim

(57) ABSTRACT

Provided is highly accurate three-dimensional board warp analysis technology that can optimize at a development design phase material quality, size, reflow heating profile, or the like of a printed wiring board and various kinds of electronic components mounted on the board. The invention is characterized in comprising a model making-out means that adds a characteristic value of a material to shape data indicative of a shape of board to make out model data, a model division means that carries out vertical and lateral divisions equally base on the model data, a calculation means that calculates warp of cutting plane and a counter sectional plane of each of the divided models, and a conversion means that connects the cutting planes with each other after the calculation and converts them into warp data on the entire coordinate system.

20 Claims, 5 Drawing Sheets

32 COMPONENT

31 PRINTED CIRCUIT BOARD though the FEM and takes not only a lot of time to set up the
THREE-DIMENSIONAL BOARD WARP ANALYSIS SYSTEM, THREE-DIMENSIONAL BOARD WARP ANALYSIS DEVICE, THREE-DIMENSIONAL BOARD WARP ANALYSIS METHOD AND PROGRAM This application is the National Phase of PCT/JP2008/067637, filed Sep. 29, 2008, which is based on and claims the benefit of priority from Japan patent application No. 2007-258298, filed on Oct. 2, 2007, the disclosure of which is incorporated herein in its entirety by reference.

TECHNICAL FIELD

The present invention relates to three-dimensional board warp analysis method and its system and three-dimensional board warp analysis program for finding out an optimum condition to prevent the connecting reliability from declining caused by warps generated in electronic components and printed circuit boards under the reflow process where LSI packages such as BGA (Ball Grid Array), CSP (Chip Size Package) and etc. and other electronic components are mounted on the printed circuit boards by soldering, and more particularly finding out an optimum condition to prevent warps from generating in electronic components and printed circuit boards applied for mobile electronic equipments, in which the generation of warps has got obvious caused by the weakened bending rigidity of printed circuit boards under the light/slim/short/small trend.

BACKGROUND ART

In recent years, higher density and higher reliability are strongly demanded for mounting technology as electronic equipments have been rapidly marching to the goal of the light/slim/short/small trend. Under such circumstances, with getting smaller and slimmer size of mounted components, in the reflow process in which components are mounted on printed circuit boards with solder, warps of printed circuit boards and mounted components get larger by heat and it is pointed out that the connecting reliability might get worse when components are mounted on the printed circuit boards under such conditions. Therefore it is highly necessary in order to solve these problems to estimate the warp movements under the reflow process quantitatively and accurately before the actual ones.

However, as it is very difficult to monitor generating warps under high temperature, the estimation technique by a simulation using the Finite Element Method (FEM) is studied at associated enterprises, universities and research institutes at present. For example, the warp analysis system for printed circuit boards, being multilayered board, is proposed in the patent document 1. And estimating methods by applying theoretical formula can be considered in addition to the FEM, and there is the multilayered beam theory in the non-patent document 1 in order to handle the warps of multilayered boards, moreover there is the patent document 2 in order to handle the warps in conditions that components are mounted on the multilayered boards.

Patent document 1: Japanese patent Laid-open publication No. 2004-013437
Patent document 2: Japanese patent Laid-open publication No. 2006-278803
Non-patent document 1: written by Oda, Juhachi "The evaluation of stress and deformation of printed circuit boards by the multilayered beam theory", Transactions of The Japan Society of Mechanical Engineers; Vol. 59 No. 563 (1993), pp. 203-208

DISCLOSER OF THE INVENTION

Problems to be Solved by the Invention

However, the method used in the patent document 1 is based on the FEM and takes not only a lot of time to set up the analysis model (transcribed as "model" hereinafter) but also requires special knowledge of the FEM. Therefore the actual situation of design engineering section which has to develop mobile electronic equipments in a very short period can be hardly allowed to adopt the FEM technology in step with the development speed.

And beside the FEM methods there are the method of "theoretical formula for multilayered beam warps" in the non-patent document 1 and the patent document 2 as the warp calculation method for multilayered boards mounted with components. However, either method can handle only two-dimensional shapes. Therefore either has problems that its estimating accuracy is not high. And, although there is a theoretical formula which can handle the warps of three-dimensional plane (called as "the Timoshenko's Plate Theory") in the mechanics of materials, there are problems that it can handle only one single layer plane and cannot handle the planes mounted with components.

Therefore the problem to be solved by the present invention is to provide highly accurate three-dimensional board warp analysis method and its system, three-dimensional board warp analysis program which can optimize the materials and dimensions of a printed circuit board and electronic components mounted on it and the reflow temperature profile at the development design stage.

Means to Solve the Problem

The present invention for solving the above mentioned problems is characterized in comprising: a model producing means for producing model data with adding material characteristic values to the shape data indicating the shape of the board; a model dividing means for dividing the model vertically and laterally into equal interval divisions based on the above mentioned model data; the calculating means for calculating the warps of cut cross sections and outer cross sections of each of above mentioned divided models; and a conversion means for connecting the cut cross sections together after the above mentioned calculation and converting to the warp data of the global coordinates system.

The present invention for solving the above mentioned problems is characterized in comprising: a dividing step of dividing model data indicating the shape of circuit boards and electronic components; a calculating step of calculating warps of cut cross sections and outer cross sections of each of above mentioned divided model using the warp theory formula; and a conversion step of transforming the above mentioned divided model data based on the above mentioned warp data and connecting the above mentioned cut cross sections each other and converting to the warp data of the global coordinates system.

The present invention for solving the above mentioned problems is characterized in comprising: the first step of judging the necessity of dividing based on the model data of dimensions and material characteristic values of the printed circuit boards and the electronic components; the second step of dividing the models needed to be divided based on the above mentioned judgment; the third step of calculating the warps of cut cross sections and outer cross sections of each of above mentioned divided models; the forth step of connecting above mentioned cut cross sections together after the above mentioned calculation of warps; and the fifth step of converting warp data of the above mentioned connected models to those of the global coordinates system.

The present invention for solving the above mentioned problems is a program for the three-dimensional board warp analysis apparatus and is characterized, in which the program causes the above mentioned apparatus to execute a dividing step of dividing the model data indicating the shape of boards and electronic components; a calculating step of calculating warps of cut cross sections and outer cross sections of each of above mentioned divided model using the warp theory formula; and a converting step of transforming the above mentioned divided model data based on the above mentioned warp data, connecting the above mentioned cut cross sections each other, and converting the warp data to those of the global coordinates system.

The present invention for solving the above mentioned problems is a three-dimensional board warp analysis apparatus and is characterized in comprising: a model producing means for producing model data with adding material characteristic values to the shape data indicating the shape of the board; a model dividing means for dividing the model vertically and laterally into equal divisions based on the above mentioned model data; the calculating means for calculating the warps of cut cross sections and outer cross sections of above mentioned each divided model; and a converting means for connecting the above mentioned cut cross sections each other after the above mentioned calculation and converting to the warp data of the global coordinates system.

Effect of the Invention

In FEM, the model has to be divided (discretization) into many elements and the discretization errors are coming in. On the other hand, the present invention provides quite accurate three-dimensional solutions as effects of being free from the discretization errors.

EXPLANATION OF SYMBOLS

Figure 1:
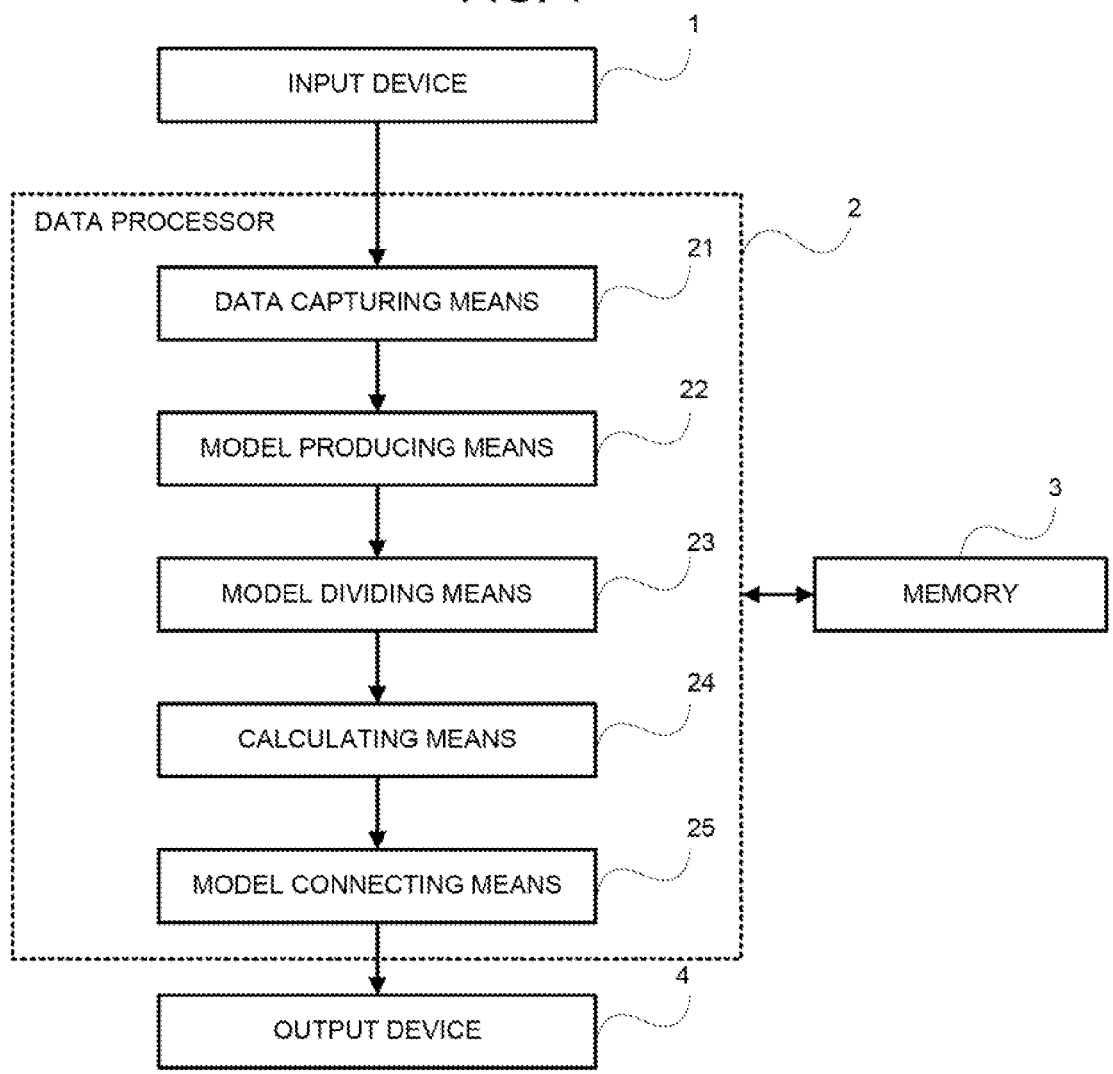
FIG. 1 is a block diagram illustrating a configuration of a first embodiment of the present invention.

1 Input device
2 Data processor
3 Memory
4 Output device
5 Three-dimensional board warp analysis program
21 Data capturing means
21 Model producing means
23 Model dividing means
24 Calculating means
25 Model connecting means
31 Printed circuit board
32 Component
A1 Model division judging process
A2 Model dividing process
A3 Warp calculating process based on the multilayered beam theory considering Poisson's ratio
A4 Connecting process for connecting each of the cut cross sections together
A5 Converting process for converting the warp data to those of the global coordinates system
L Length of multilayered board
b Width of multilayered board
α Coefficient of thermal expansion (suffixes in the drawing are indicating the number of the layer)
ν Poisson's ratio
E Young's modulus (suffixes in the drawing are indicating the number of the layers)
N Total number of layers
R Radius of curvature (R with a suffix in the drawing is indicating the radius of curvature in the layer number, R with no suffix is indicating the radius of curvature representing all the layers)
$\{\in\}$ Strain vector
$\{P\}$ Axial force vector
$[K]$ Rigidity matrix

BEST MODE FOR EXECUTING THE PRESENT INVENTION

The present invention is characterized in its configuration which makes the estimation of warps faster at the development designing stage based on the newly developed theoretical formula not using the FEM. Here, the outline is explained as follows, while details of the applied formula are described later; in general formulas for three-dimensional single layer board is not useful for calculating the warps of multilayered board. While only the two-dimensional multilayered beam theory could handle the multilayered ones, the newly developed theoretical formula is extended to be able to handle the three-dimensional ones based on the multilayered beam theory.

That is to say, in handling the CAD data of the three-dimensional multilayered board, the multilayered beam theory is applied in the direction of cross section (cross layer) in order to calculate the warps, while the total warp is not calculated directly in the plane direction. And it is a very large different point existing in the deformation behavior of two-dimensional beams and three-dimensional planes that in the three-dimension when a strain comes out in a direction caused by expansion or contraction, an elastic strain of an opposite sign arises in the right angle direction to the former strain. Further explaining, the ratio of these strains is called "Poisson's ratio".

And another feature of the present invention is that the bending rigidity of the beam (including no Poisson's ratio)

being applied in the multilayered beam theory is replaced with the bending rigidity of the plane because the parameter, being the bending rigidity of the plane, which is applied in the three-dimensional single layer plane (discussed later) includes the Poisson's ratio. Moreover, in order to handle the multilayered board with components mounted, when there are components mounted on the board, the board is cut on the cutting line which passes through the inside of mounted components and the warp of each cutting cross section is calculated and finally deformed cutting cross sections are connected together.

Further explaining, in order to get higher accurate results, it is necessary to consider the Poisson's ratio in the theoretical formula. But it has been impossible to include the Poisson's ratio by itself into the original multilayered beam theoretical formula in which no Poisson's ratio has ever existed, while the warp theoretical formula applied to the present invention is based on the multilayered beam theory.

Further explaining, the warps of the cross sections of the board with components mounted can be calculated with the method proposed in the patent document 2 but cutting line of the method passes on the border line between a component mounted area and other area of the board. That is to say, each warp is calculated on the cross sections which were cut out following the outer edge of components. On the other hand, the cutting line of the present invention passes through the inside of the components in the three-dimensional data, which is completely different from the method of the patent document 2.

The present invention is comprised as follows; the model data of boards and electronic components, which indicate their three-dimensional shape at least are taken through an input device with a data capturing means, material characteristics such as Young's modulus E, coefficient of thermal expansion α, Poisson's ratio ν and others selected from material libraries and so on are added to the captured model data by a model producing means, the model data added with the material characteristics are divided vertically and laterally into equal interval divisions by a model dividing means, the warps of the cut cross sections and the outer cross sections of each above mentioned divided model data are calculated by a calculating means based on the multilayered beam theoretical formula considering the effects of Poisson's ratio, and each of the cut cross sections of transformed model data whose warps have been calculated are connected, and the calculated warp data are converted to the warp data of the global coordinates system. Therefore, the present invention makes it possible to estimate the state of three-dimensional warps quite accurately and rapidly with no needs to make FEM models which demand special knowledge and plenty experience to be handled.

The followings are specific descriptions with reference drawings in order to explain features of the present invention.

By referring to FIG. 1, as the first embodiment of the present invention, it is comprised of an input device 1, a data capturing means 21, a model producing means 22, a model dividing means 23, a calculating means 24, a model connecting means 25, an output device 4, and a memory 3, and a data processor 2 is integrated with a data capturing means 21, a model producing means 22, a model dividing means 23, a calculating means 24 and a model connecting means 25.

The detailed explanation of each means is as follows.

For example, at least the shape data of printed circuit boards and electronic components are captured with a data capturing means 21 through an input device 1 which is installed with CAD (Computer Aided Design) and so on. Explaining further, the shape data include the length and width of electronic components, and their mounted location on the printed circuit board, and furthermore, the length of the board mounted with electronic components and also the thickness of insulation layers and circuit layers and so on.

A model producing means 22 produces model data with adding material characteristic values such as Young's modulus E, coefficient of thermal expansion α, Poisson's ratio ν and others selected from material libraries and so on to the shape data captured from. Further explaining, in the material libraries there are a lot of material characteristic values registered for the analyzing objects such as permittivity, dielectric constant and so on.

Next, the shape data of the printed circuit boards in the above mentioned model data are divided vertically and laterally into equal interval divisions with a model dividing means 23 and the cutting lines pass through the inside of mounted components when there are electronic components mounted on the boards. Further explaining, in case of the printed circuit board data without electronic components mounted, it can go to a calculating means 24 with no needs to be divided.

Next, the warps of cut cross sections and outer cross sections of each of above mentioned divided models or the warps of outer cross sections in case of the board data are calculated with a calculating means 24 which is adopting the multilayered beam theoretical formula considering the effects of Poisson's ratio ν.

Next, the divided models are connected to be back to the one single model with the model connecting means, for connecting each of the cut cross sections. Moreover, the warp of the total model is calculated after the calculated warp data are converted to the data of the global coordinates system. And also, the data processed in the data processor 2 are stored in a memory 3 and the results are outputted through an output device 4.

Processing through the above mentioned means, the effects that the three-dimensional warps under the conditions such as being heated in a reflow process of soldering electronic components on printed circuit boards can be estimated in a short period is gained.

Next, the second embodiment of the present invention is explained in detail by referring to the drawings. It is possible to realize the above mentioned configuration of the present invention not only with hardware but also with computer programs as it is obvious from the above mentioned explanation. In this embodiment, such configuration as software is explained.

Figure 3:
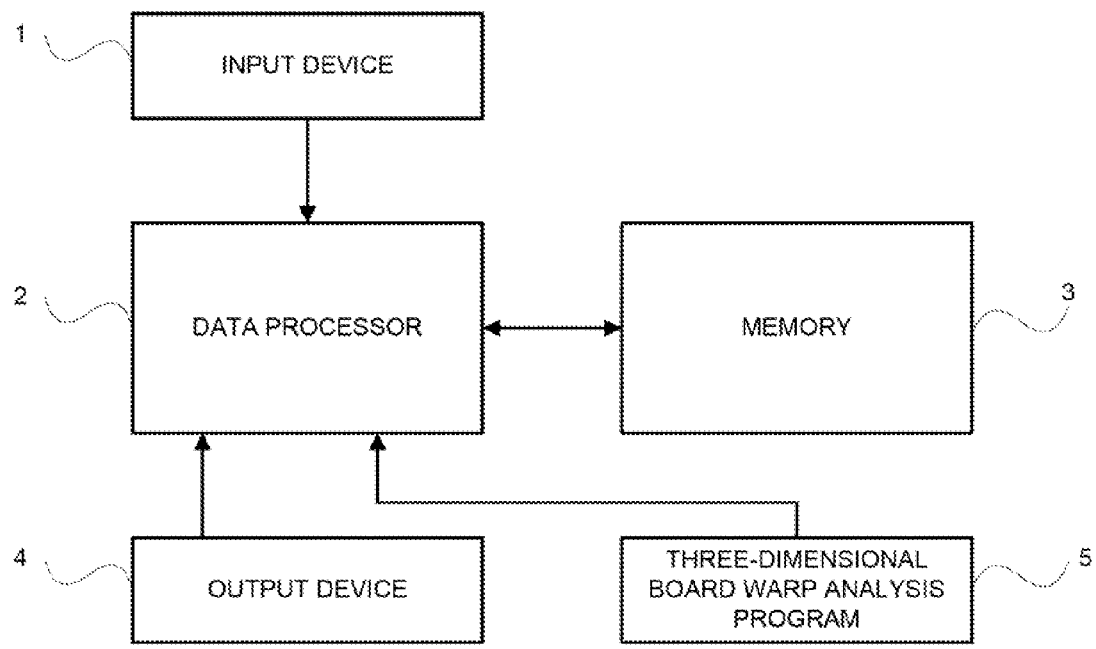
FIG. 3 is a block diagram illustrating a composition of the program of the present invention.

By referring to FIG. 3, the second embodiment of the present invention is comprised of an input device 1, a data processor 2, a memory 3, an output device 4 and a three-dimensional board warp analysis program 5 as same as the first embodiment of the present invention. A three-dimensional board warp analysis program 5 controls process and movement of the data registered in the data processor 2 and the memory 3 stores the results of processing in the data processor 2.

As mentioned above, the data processor 2 carries out the same process under the control of the three-dimensional board warp analysis program 5 as same as the process by the data processor 2 of the first embodiment.

Further explaining, a part of the functions of the above mentioned embodiment can be replaced with computer programs.

Figure 2:
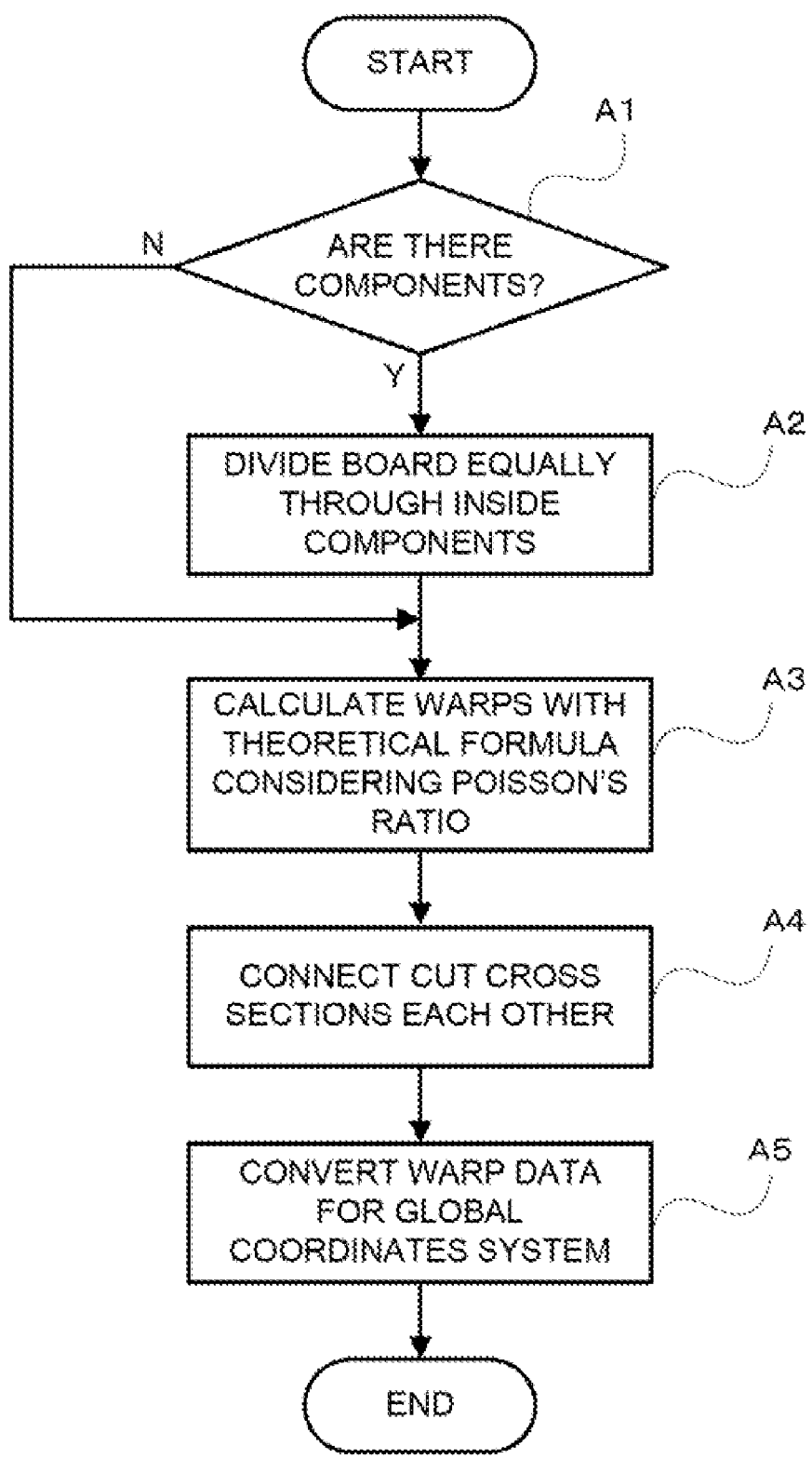
FIG. 2 is a flow chart from the model dividing to the model connecting in the present invention.

Next, details of processes from model dividing through model connection, which are especially important for the present invention are shown in a flow chart of FIG. 2.

The inputted three-dimensional model data at first passes through a model division judging process A1 which judges whether there are components mounted on the board or not.

In case of no components mounted on the board, it is not necessary to divide the board and the warp is calculated with the multilayered beam theory considering Poisson's ratio on the outer cross sections. In case of components mounted on the board, the next process is a model dividing process A2 in which the board is divided vertically and laterally into equal interval divisions with the cutting lines passing through the inside of mounted components. The next process after dividing is a warp calculating process A3 which calculates the warps of each cut cross section and outer cross section based on the multilayered beam theory considering Poisson's ratio.

The next process after calculation of the warp on each cross section is a connecting process A4 in which each of the cut cross sections are connected together. Further explaining, as the warps calculated in the process A3 are calculated in the local coordinates system whose origin is an edge fixed on each of cut cross sections or outer cross sections, the data of the warps are those of the local coordinates system before dividing. Therefore, advancing to a converting process A5 in which the warp data are converted to those of the global coordinates system, the state of three-dimensional warps of the whole board can be calculated.

Figure 10:
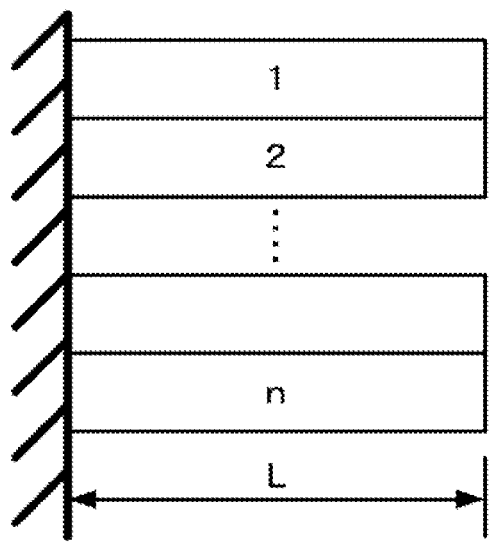
FIG. 10 is a schematic diagram of the cross sections of the multilayered board before the deformation.
Figure 11:
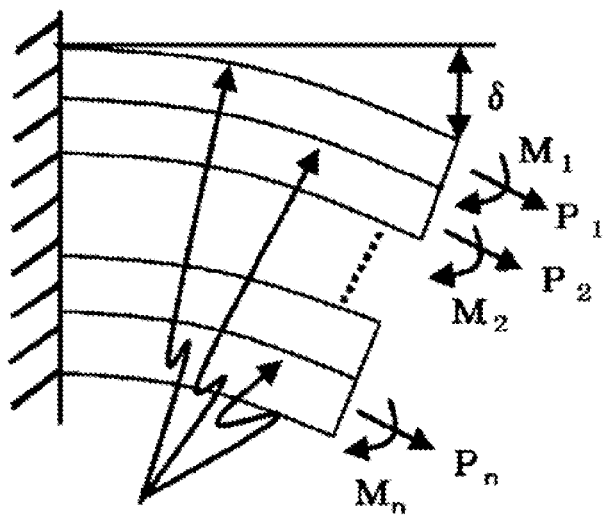
FIG. 11 is a schematic diagram of the cross sections of the multilayered board after the deformation.

At this point, the theoretical formula for calculation of the warp is explained since it is one of the features of the present invention. At first, the multilayered beam theory mentioned in a non-patent document is explained. A case in which an n-layered beam shown in FIG. 10 is deformed as that shown in FIG. 11 is considered. Considering thickness of each layer is negligibly small as compared with its radius of curvature, and under the conditions that radiuses of curvature of each layer, R1, R2, ... Rn are equal, the typical radius of curvature is defined as R. The warp of the board can be calculated after calculating the radius of curvature R that was an unknown quantity. The calculating method is shown as follows below.

$$R_1 \approx R_2 \approx \ldots \approx R_n = R \qquad (1)$$

And a balance equation for continuous conditions of warps on the bonding surfaces of multilayered beams and an axial force Pi and bending moment Mi generated in each layer is shown below as equation (2).

$$\{\in\} = [K]\{P\} \qquad (2)$$

Here, $\{\in\}$ is a strain vector, $\{P\}$ is an axial force vector and $[K]$ is a rigidity matrix and the following relations stand up.

$$\{P\}^t = \left\{ P_1 \quad P_2 \quad \ldots \quad P_n \quad \frac{1}{R} \right\} \qquad (3)$$

$$\{\varepsilon\}^t = \{ \alpha_1 - \alpha_2 \quad \alpha_2 - \alpha_3 \quad \ldots \quad \alpha_{n-1} - \alpha_n \quad 0 \quad 0 \}T \qquad (4)$$

$$[K] = \qquad (5)$$

$$-\begin{bmatrix} \frac{1}{bt_1E_1} & -\frac{1}{bt_2E_2} & 0 & \cdots & & -\frac{t_1+t_2}{2} \\ 0 & \frac{1}{bt_2E_2} & -\frac{1}{bt_3E_3} & \cdots & & -\frac{t_2+t_3}{2} \\ \vdots & \vdots & & \ddots & & \vdots \\ 0 & 0 & \cdots & \frac{1}{bt_{n-1}E_{n-1}} & -\frac{1}{bt_nE_n} & -\frac{t_{n-1}+t_n}{2} \\ 1 & 1 & \cdots & & 1 & 0 \\ \overline{y}-\frac{t_1}{2} & \overline{y}-t_1\frac{t_2}{2} & \cdots & \overline{y}-t_1-t_2 & -\ldots- & \frac{t_n}{2}Y \end{bmatrix}$$

$$Y = \sum_{i=1}^{x} E_i I_i \qquad (6)$$

And when increase of the length of the multilayer beam is neglected (L'=L) and the flexure generated in n-layer beam is defined as δ, an equation (7) stands up as follows.

$$\delta = \frac{L^2}{2R} \qquad (7)$$

Consequently, flexure δ can be calculated after calculating the radius of curvature R with the equation (2) and substituting the R into an equation (7). Programming this matrix-type equation, the warps of multilayer board can be calculated in a short period with no needs for simulation of FEM.

However, the multilayered beam theoretical formula is that of two-dimensions, and effects of vertical direction to the cross section plane cannot be considered. By the way, E in an equation (6) is Young's modulus of each layer and I is a section great moment of each layer (i indicates number of layers but no more shown in this explanation because it makes explanation much complicated), and EI which is made with multiplying the E by the I is shown as an equation (8) and is called as flexural rigidity of beam. Here, t is thickness of the layer and b is width of the beam. And above mentioned Poisson's ratio is not included in the equation (8) because effects of vertical direction to the cross section plane cannot be considered in the equation (8). And as the equation (8) includes the parameter, width b, it happened to be considered that three-dimensional warp shape could be calculated when the length of vertical direction to the cross section plane is inputted instead of width b. But the width b is only for calculating the section great moment of beams not for that of planes.

$$EI = E \times bt^3/12 \qquad (8)$$

On the other hand, the bending theory of three-dimensional plane is mentioned in documents of mechanics of materials and so on, and the flexural rigidity D of plane is shown as follows.

$$D = E \times (bt^3/12(1-v^2)) \qquad (9)$$

Although the equation (9) is similar with the equation (8), it is quite different in the part of including Poisson's ratio.

Here, details of Poisson's ratio are explained. Poisson's ratio is the ratio of strain in AA cross section (the cross section in direction of the paper surface in FIG. 7) and that in BB cross section (cross section in depth direction) being vertical to the AA cross section shown in FIG. 6 as an example. And it causes effects on the radius of curvature of the board, that is to say, the warp. However, in the beam strain theory (almost all are one single layer) in mechanics of materials and also in the multilayered beam theory which is applied to the present invention, there is no parameter such as depth in the three-dimensions because only warps in the two-dimensions are handled. Therefore the idea to integrate Poisson's ratio into the multilayered beam theory was not developed.

$$Y = \sum_i E \times (bt^3/12(1-v^2)) \qquad (10)$$

In the present invention, warps of the multilayered cross sections are calculated by employing the multilayered beam theory to newly generated cut cross sections and original outer cross sections after cutting CAD data of a multilayered board mounted with components, on the cutting lines passing through inside the components. Therefore the effects of Poisson's ratio can be added to the outer cross sections and also the cross sections cut in the depth direction. Applying a new equation (10) which was created with the equation (8) being integrated with the equation (9), the warps including effects of Poisson's ratio on each of the cut cross sections can be calculated. Moreover, each of cut cross sections in which warps were calculated is connected together again, and at last it was realized by converting to the warp data of the global coordinates system to calculate the data of three-dimensional warps with considering the Poisson's ratio of the models before cutting.

The degree of effects on the warp caused by Poisson's ratio is examined as follows.

Figure 4:
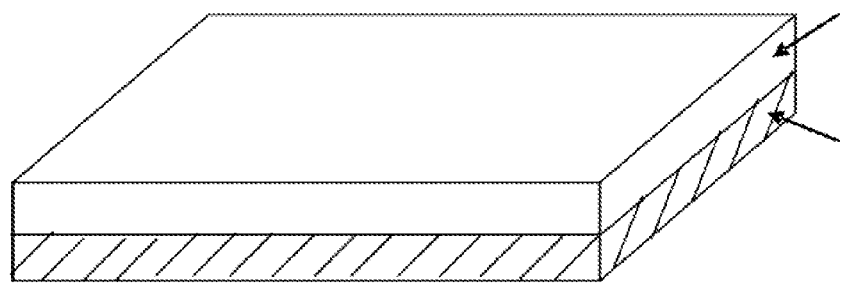
FIG. 4 is an example of an FEM simulation model.

FIG. 4 shows a three-dimensional two-layer model created with the software of Finite Element Method (FEM). Its length and breadth are 20 mm each, thickness of each layer is 0.3 mm and 1 mm size meshing is executed on it.

Figure 5:
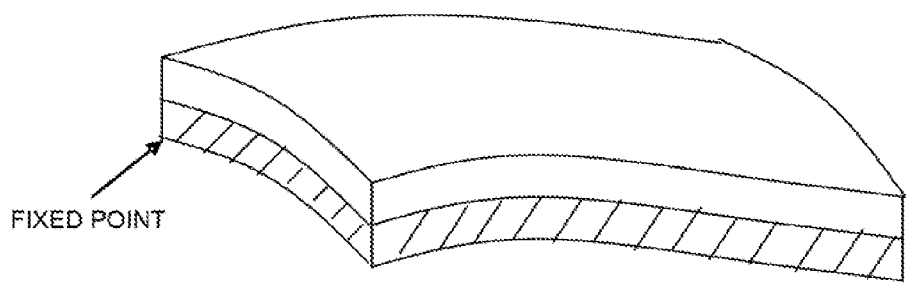
FIG. 5 is an example of warp results of an FEM simulation.

It is assumed that the upper layer is Au (Young's modulus 78000 MPa, Poisson's ratio 0.44, coefficient of linear expansion 1.4e−5) and the lower layer is Cu (Young's modulus 131500 MPa, Poisson's ratio 0.34, coefficient of linear expansion 2.0e−5). The board will generate warps when the model is heated up by 10 degree C. and the model of this combination generates a warp of 0.03 mm under the lower surface shown in FIG. 5.

Next, a warp of 0.028 mm is resulted from the calculation under the condition that the Poisson's ratio of Cu is to be 0.44 as same as that of Au, which makes the state free from the effect of Poisson's ratio. Therefore, generated error of approximately 7% is found out in this example. It can be estimated that the accuracy of warps is much worse unless Poisson's ratio is considered, since most of printed circuit boards comprise approximately 20 layers of various materials whose values of Poisson's ratio are also various.

Therefore, in the present invention, the plane flexural rigidity D is applied instead of the beam flexural rigidity EI of two-dimensional multilayered beam theory in order to get higher accurate results in calculating three-dimensional warps. Further, the calculation of warps of the boards mounted with components can be carried out as follows. For example as described in a patent document 2, separating the area of the board mounted with components from the area of the board with no components mounted, the warps are calculated with considering each area is a multilayered beam and the warps can be calculated after combining each result.

With implementing the above mentioned means, any element dividing work in FEM which needs a lot of time and knowledge is completely unnecessary. The warps can be estimated in a short period with calculating software in the market integrated with the present invention, even if components of different length are mounted. Therefore it can support the optimum engineering at the actual design site.

AN EXAMPLE

Next, the first example of the present invention is explained referring to drawings. This example corresponds to the first embodiment of the present invention.

The present example includes a keyboard and a mouse as an input device, a personal computer as a data processor, a magnetic hard disk device as a memory, and a display monitor as an output device. The data processor 2 comprises of the input device 1, the data capturing means 21, the model producing means 22, the model dividing means 23, the calculating means 24, the model connecting means 25, the output device 4 and the memory 3.

Model data is produced by the model producing means 22 by adding material characteristic values such as Young's modulus E, coefficient of thermal expansion α, Poisson's ratio ν, and so on which are selected from material libraries and so on to the shape data and others of the boards or the electronic components which are captured by the data capturing means 21 through the input device 1.

Next, when model data is mounted with components, it is divided with the model dividing means 23. And warps of cut cross sections and outer cross sections of the divided model are calculated by the calculating means 24. The calculating means 24 calculates the warps with programmed equations applied with the plane flexural rigidity instead of the beam flexural rigidity in the multilayered beam theoretical formula.

Moreover, each of the above mentioned divided models is deformed with the above mentioned calculated warps. And each of the cut cross sections are connected together by the model connecting means 25 in the global coordinates system. And data processed by the data processor 2 are stored in the memory 3 and results are outputted through the output device 4.

The embodiment of the present invention is explained herein specifically as follows, with a model of the printed circuit board 31 mounted with the component 32 shown in FIG. 6 as an example.

Figure 6:
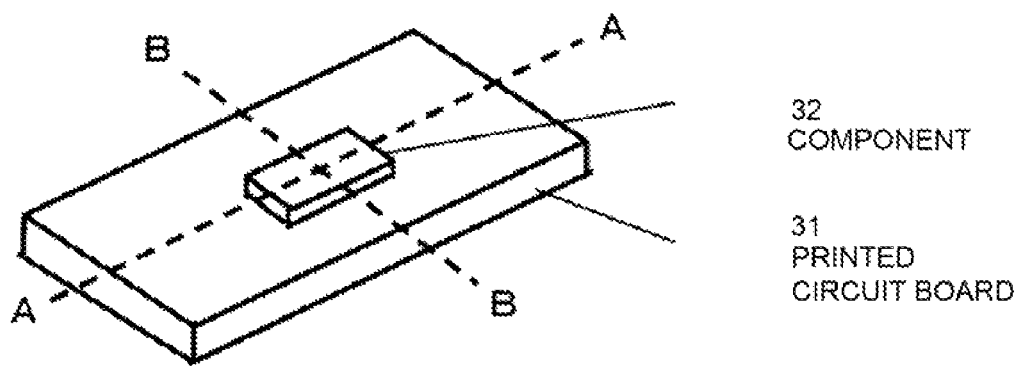
FIG. 6 is a schematic diagram illustrating the model dividing by the present invention.

At first it is judged at the process A1 shown in FIG. 2 whether there are components mounted on the board, and the next process is the process A2 because the board is mounted with components in an example of FIG. 6. Herein the board is divided vertically and laterally into equal interval divisions with the cutting lines passing through the inside of the mounted component 32. It is divided into four divisions in this example.

Figure 7:
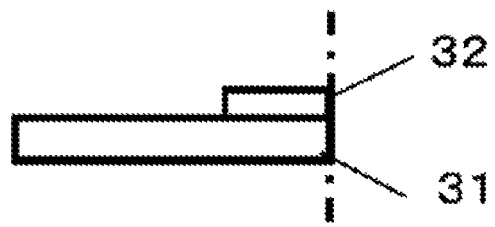
FIG. 7 is a schematic diagram of a cross section of the divided model divided by the present invention.
Figure 8:
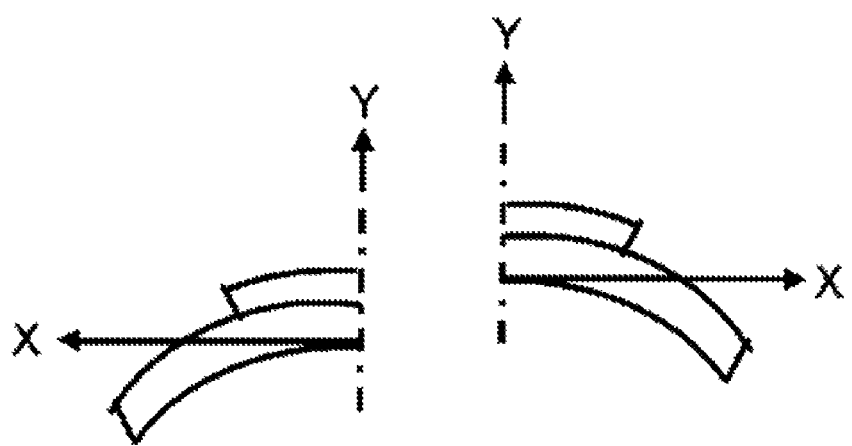
FIG. 8 is a schematic diagram illustrating the calculated warps of each divided model cross section divided by the present invention.

The next process is the process A3, and here the warp of each cross section is calculated after inputting the temperature of reflow soldering process by the equation in which the plane flexural rigidity D is applied instead of the beam flexural rigidity EI of two-dimensional multilayered beam theoretical formula. FIG. 7 shows the cross section AA of one division of the four-divided model and FIG. 8 shows the state of warps after the calculation.

Figure 9:
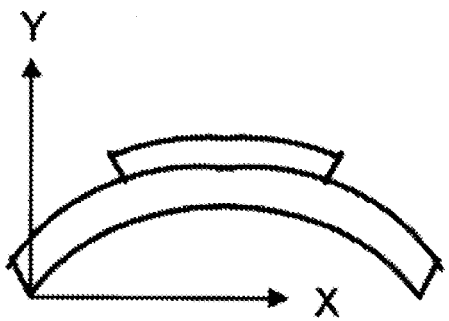
FIG. 9 is a schematic diagram illustrating the warps of connected divided models in the global coordinates system by the present invention.

The next process is the process A4 in which each of cut cross sections is connected together. In the present invention as the model is divided vertically and laterally into equal interval divisions, width b of each division in the equation (9) is equal and the warps of cut cross sections can be connected together. However, since the warps calculated by the multilayered beam theory are calculated in the local coordinates system whose origin is located on an edge which is fixed on each of cross section models, the total warp has not been calculated yet even when each of the cut cross sections was connected together. Therefore, advancing to the next process A5 in which the warp data are converted to those of the global coordinates system, three-dimensional warps of the whole model before dividing in FIG. 6 can be calculated as shown in FIG. 9.

As mentioned above, the effect of Poisson's ratio can be considered because the warps in the direction at right angles to the cross section in the direction of the paper surface and also to the cross section in the depth direction can be calculated with dividing three-dimensional data by the present invention. Therefore it is one of the greatest features of the present invention that the flexural rigidity of beam in the multilayered beam theory is replaced with the flexural rigidity of plane. Therefore the warps of highly accurate three-dimensional multilayered boards can be calculated by the theoretical formula while it had been impossible before.

Explaining in detail, in FEM a model has to be divided (discretization) into a lot of elements and in this process discretization errors are generated. On the contrary, since the present invention includes no such errors, a highly accurate three-dimensional solution can be calculated as a result.

And in FIG. 1, a block diagram of the three-dimensional warp calculation system, any element dividing work in three-dimensional FEM model producing which requires special knowledge and experience is completely unnecessary as the multilayered beam theory which includes Poisson's ratio is applied to the calculating means 24. Therefore as a result, the conditions to minimize the warps by changing materials and dimensions of the printed circuit board can be estimated at the design engineering stage in a short period.

And as the model dividing means 23 is provided in front of the above mentioned calculating means 24 and the model connecting means 25 is provided at the back of it, the state of the three-dimensional warps of printed circuit boards mounted with electronic components can be calculated as a result.

And while even a comparatively cheaper version of the general-purpose FEM analysis software including pre- and post-processors and a solver costs 3 million to 5 million Japanese Yen, the introducing expense for a warp estimation technology can be reduced by two digits as a result with applying the present invention because it can be implemented in a general-purpose computing software such as EXCEL which costs only several ten thousands Japanese Yen.

The present invention can be applied to such uses as support tools for studying the reduction of warps under reflow soldering process at a design engineering section which has to develop mobile electronic equipments in a very short period.

The invention claimed is:

1. A three-dimensional board warp analysis system, comprising:
    hardware, including a processor;
    a non-transitory computer-readable data storage medium to store a computer program executable by the processor;
    a model producing part of the computer program for producing model data by adding values of material characteristics to shape data indicating shape of boards;
    a model dividing part of the computer program for dividing a model vertically and laterally into equal interval divisions based on said each model data;
    a calculating part of the computer program calculating warps of cut cross sections and outer cross sections of each said divided model; and
    a converting part of the computer program for connecting said calculated cut cross sections with each other and converting warp data in accordance with a global coordinates system.

2. A three-dimensional board warp analysis system according to claim 1, wherein said converting part of the computer program transforms said divided model data based on said warp data and converts the warp data in accordance with the global coordinates system by connecting said cut cross sections with each other.

3. A three-dimensional board warp analysis system according to claim 1, wherein said calculating part of the computer program uses a theoretical formula, in which a flexural rigidity of beam in a multilayered beam theory is replaced with a flexural rigidity of plane, as a method for calculating warps of said cut cross sections and said outer cross sections.

4. A three-dimensional board warp analysis system according to claim 1, wherein said dividing part of the computer program judges whether electronic components are mounted or not based on said model data, and divides the boards when components are mounted.

5. A three-dimensional board warp analysis system according to claim 1, wherein said dividing part of the computer program divides shape data of the board vertically and laterally into equal interval divisions with cutting lines passing through an inside of the mounted components.

6. A three-dimensional board warp analysis system according to claim 1, wherein said calculating part of the computer program calculates warps of each cut cross section and each outer cross section employing a calculating equation based on a multilayered beam theory in which a plane flexural rigidity is integrated in order to consider an effect of Poisson's ratio.

7. A three-dimensional board warp analysis system according to claim 1, wherein said converting part of the computer program connects each cut cross section having said calculated warp.

8. A three-dimensional board warp analysis method, comprising:
    a dividing step of dividing model data indicating shape of boards and electronic components;
    a calculating step of calculating warps of cut cross sections and outer cross sections of each said divided model with applying a warp theoretical formula; and
    a converting step of transforming said divided model data based on said warp data, connecting said cut cross sections together, and converting warp data to in accordance with a global coordinates system.

9. A three-dimensional board warp analysis method according to claim 8, wherein said method uses a theoretical formula, in which a flexural rigidity of beam in a multilayered beam theory is replaced with a flexural rigidity of plane, as a method for calculating warps of said cut cross sections and said outer cross sections.

10. A three-dimensional board warp analysis method according to claim 8, wherein said dividing step judges whether electronic components are mounted or not based on said model data, and divides the board when components are mounted.

11. A three-dimensional board warp analysis method according to claim 8, wherein said dividing step divides shape data of the board vertically and laterally into equal interval divisions with cutting lines passing through an inside of the mounted components.

12. A three-dimensional board warp analysis method according to claim 8, wherein said calculating step calculates the warps of each cut cross section and each outer cross section by employing a calculating equation based on a multilayered beam theory wherein a plane flexural rigidity is integrated in order to consider an effect of Poisson's ratio.

13. A three-dimensional board warp analysis method according to claim 8, wherein said converting step connects each cut cross section having said calculated warp.

14. A three-dimensional board warp analysis method, comprising:
    a first step of judging whether it is necessary to divide a model or not based on model data including dimensions and material characteristic values of printed circuit boards and electronic components;
    a second step of dividing the model which needs to be divided based on said judgment;

a third step of calculating warps of cut cross sections and outer cross sections of each said divided model;

a fourth step of connecting cut cross sections with each other after said calculating warps is performed; and a fifth step of converting warp data of said connected model to in accordance with a global coordinates system.

15. A three-dimensional board warp analysis method according to claim 14, wherein said first step judges whether there are data of mounted electronic components or not, the step proceeds to said second step when there are data of components, and to said third step when there are no data of components.

16. A three-dimensional board warp analysis method according to claim 14, wherein in said second step divides shape data of the board vertically and laterally into equal interval divisions with cutting lines passing through an inside of the mounted components.

17. A three-dimensional board warp analysis method according to claim 14, wherein in said third step calculates warps of each cut cross section and each outer cross section with employing a calculating equation based on a multilayered beam theory wherein a plane flexural rigidity is integrated in order to consider an effect of Poisson's ratio.

18. A three-dimensional board warp analysis method according to claim 14, wherein in said fourth step connects said cut cross sections that have said calculated warp with each other.

19. A three-dimensional board warp analysis method according to claim 14, wherein in said fifth step converts said connected warp data to in accordance with the global coordinates system.

20. A three-dimensional board warp analysis apparatus comprising:

hardware, including a processor;

a non-transitory computer-readable data storage medium to store a computer program executable by the processor;

a model producing part of the computer program for adding values of material characteristics to shape data indicating shape of boards and producing model data;

a model dividing part of the computer program for dividing a model vertically and laterally into equal interval divisions based on said model data;

a calculating part of the program calculating warps of cut cross sections and outer cross sections of each of said divided model; and a converting part of the computer program for connecting said calculated cut cross sections with each other and converting warp data to in accordance with a global coordinates system.

* * * * *